Feb. 11, 1941.  E. F. WATSON  2,231,375
MULTIPLEX TELEGRAPH SYSTEM
Filed Sept. 9, 1938  4 Sheets-Sheet 1
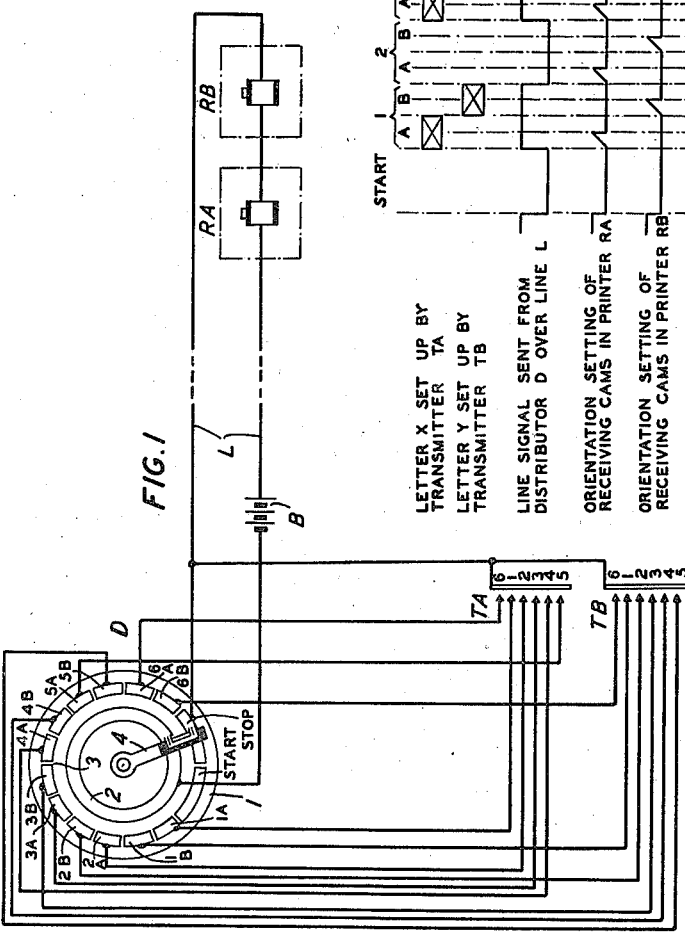
INVENTOR
E. F. WATSON
BY
J. W. Schmied
ATTORNEY

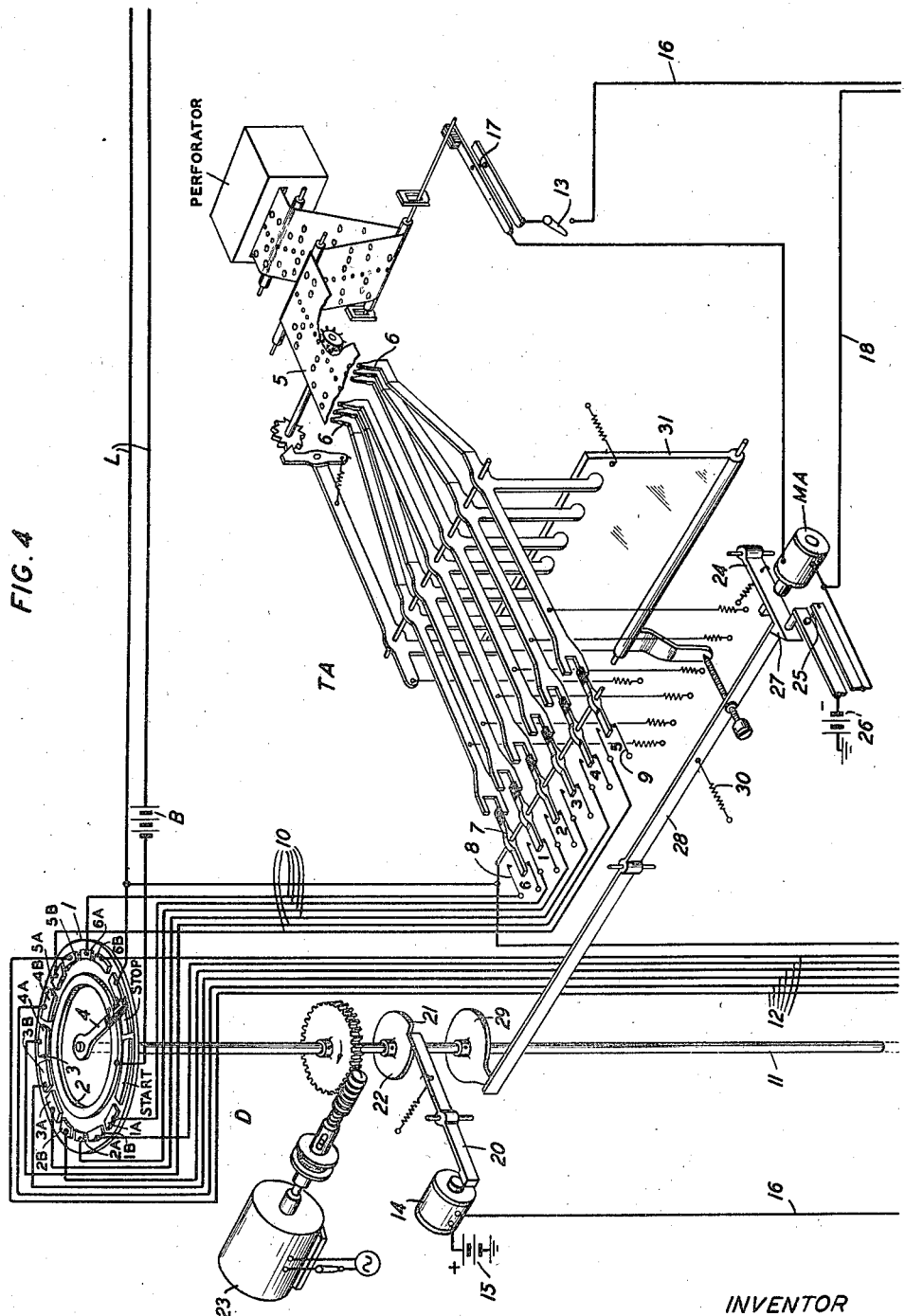

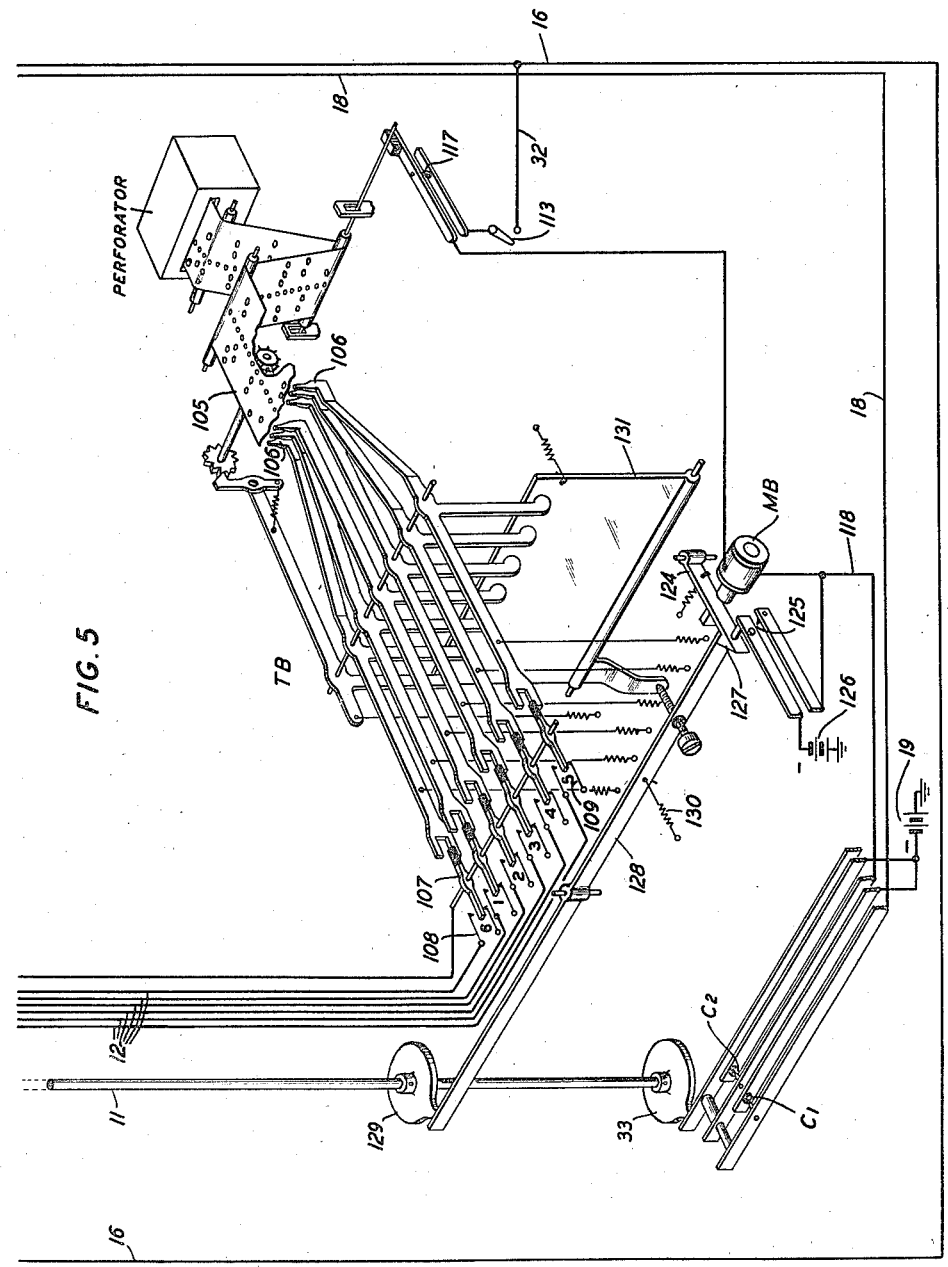

Feb. 11, 1941.  E. F. WATSON  2,231,375
MULTIPLEX TELEGRAPH SYSTEM
Filed Sept. 9, 1938  4 Sheets-Sheet 4

INVENTOR
E. F. WATSON
BY
J W Schmied
ATTORNEY

Patented Feb. 11, 1941

2,231,375

UNITED STATES PATENT OFFICE 2,231,375

MULTIPLEX TELEGRAPH SYSTEM

Edward F. Watson, Larchmont, N. Y., assignor to Bell Telephone Laboratories, Incorporated, New York, N. Y., a corporation of New York Application September 9, 1938, Serial No. 229,046

7 Claims. (Cl. 178—53.1)

This invention relates to a start-stop multiplex telegraph system and, more particularly, to a two-channel multiplex system for providing express communication service.

The invention is particularly adapted for stock market service in which a customer, such as a broker, leases a communication line leading to a central source of information, such as a stock exchange for the purpose of receiving teletypewriter signals transmitted from the central source. During periods of busy trading on the exchange, stock transactions take place more rapidly than the information of their occurrence can be transmitted from a transmitter-distributor at the stock exchange to a receiving teletypewriter at a broker's office. As this delay is cumulative, the receiving teletypewriter at the broker's office sometimes is ten or fifteen minutes late in recording a stock transaction and by that time the trend of trading may have changed.

In order to be informed of changes in the trend of trading at the time that they occur, brokers should be supplied with records of current sales of representative stocks considered to be market leaders. To be provided with such a record, a broker could obtain a second receiving teletypewriter and lease another communication line leading to the Stock Exchange. Then price quotations of only representative stocks could be sent over this line. Since only sales of market leaders would be sent over this second line, the record printed by the second receiving teletypewriter would keep pace with the transactions as they occurred. However, this express service for keeping informed of the current progress of the market would be rather expensive for the broker as not only would it be necessary for him to pay for the use of a second transmitter-distributor and a second receiving teletypewriter, but it would also be necessary for him to pay for the use of a second communication line.

Accordingly, it is an object of this invention to provide express service for a broker without it being necessary for him to incur the expense of leasing a second communication line.

It is also an object of this invention to enable two high-speed start-stop teletypewriter transmitters to operate independently and simultaneously over a single line wire or circuit for reception by standard receiving teletypewriters.

It is a further object of the invention to transmit telegraph permutation code signals, the units of which are only half the standard length, to two receiving teletypewriters which have their orientation settings differently adjusted, so that one teletypewriter will receive certain of the half-length pulses and the other teletypewriter other of these pulses.

These objects are accomplished by employing a distributor having a segmented face-plate and cutting in half all of the segments on the face-plate except the "start" and "stop" segments. Two transmitters are used and are connected to the distributor shaft by two pivoted levers contacting two cams on the shaft. During transmission, the signal units originating in the two transmitters are transmitted alternately over the single line circuit to the two receiving teletypewriters. Since the signal units are only half the standard length and since the receiving teletypewriters have their orientation apparatus oppositely adjusted, one of the receiving teletypewriters will record signals originating in one transmitter and the other receiving teletypewriter will record signals originating in the other transmitter.

The invention will be more fully described in connection with the following detailed description of the drawings in which:

Fig. 1 is a schematic diagram of the signal transmitting and receiving circuit;

Fig. 2 is a graphical representation of the telegraphic units of two permutation code combinations, such as those for X and Y, as set up by the transmitter-distributors and also as received, and, among other graphs, a graphical indication showing the receiving cams of the receiving printers to be oppositely adjusted;

Figure 6:
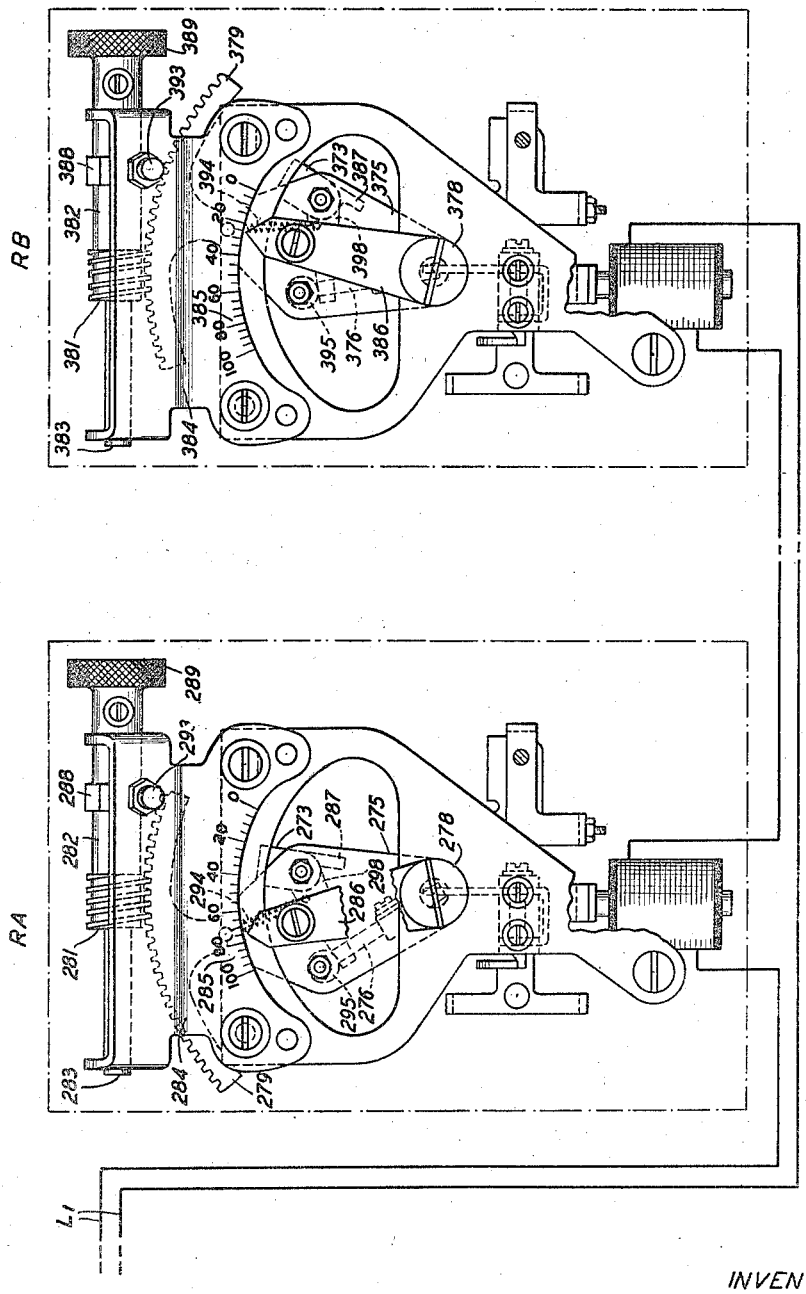

Fig. 3 indicates the relation of Figs. 4, 5 and 6 and shows the manner in which they are to be connected;

Fig. 4 illustrates the distributor and the tape transmitter TA;

Fig. 5 shows a portion of the distributor mechanically connected to the tape transmitter TB; and Fig. 6 represents the orientation apparatus of the two receiving teletypewriters, RA and RB, showing it to be oppositely adjusted.

As is shown in Fig. 1, two transmitters TA and TB are connected by a plurality of conductors to the distributor D. Distributor D comprises a face-plate 1 having a common solid ring 2 and a segmented ring 3 with a rotating brush 4 traveling over both rings 2 and 3 and is, in general, similar to the distributor disclosed in Patent 2,055,567 granted to me on September 29, 1936. The disclosure of Patent 2,055,567 is incorporated herein by reference as a part of this specification. Distributor D is connected to battery B and then over line L to the two receiving teletypewriters RA and RB which may be located at different customers' stations or may be located at only one customer's station, such as a broker's office.

The face-plate shown in Patent 2,055,567 is shown to include a segmented ring having six character selecting segments in addition to the "start" and the "stop" segments. As is known in this art, the usual permutation code employed is the Baudot code which employs five character selecting elements. Since, with the Baudot code, it is necessary to send "figures" and "letters" signals to shift and unshift the carriage, considerable time would be consumed by transmitting these shift signals when stock quotations are transmitted because of the nature of the quotations which include so many numerals interspersed alternately with letters. Consequently, it is desirable to use a six-unit code which obviates the need for shift signals.

For the purpose of this invention, the six character selecting segments of ring 3 are each cut in half although the "start" and "stop" segments remain unchanged. Each of the transmitters TA and TB is connected to alternate halves of the character selecting segments; that is, transmitter TA is connected to segments 1A, 2A, 3A, 4A, 5A and 6A and transmitter TB is connected to segments 1B, 2B, 3B, 4B, 5B and 6B.

When brush 4 rotates over the segments of ring 3, the current in line L will be interrupted in accordance with the code combinations set up in the transmitters TA and TB. These current interruptions will be received by both receiving teletypewriters RA and RB. Since the orientation apparatus of the teletypewriters RA and RB is oppositely adjusted as will be described in more detail hereinafter, one receiving teletypewriter RA will record what would normally be the first half of a standard code unit and the other receiving teletypewriter RB will record what would ordinarily be the last half of a code unit.

Due to the character selecting segments of ring 3 being cut in half, the receiving teletypewriter RA will actually record the codes set up on segments 1A, 2A, 3A, 4A, 5A, and 6A by transmitter TA and the receiving teletypewriter RB will respond to the codes set up on segments 1B, 2B, 3B, 4B, 5B, and 6B by transmitter TB. As the "start" and "stop" segments are of standard length, both teletypewriters RA and RB will respond to the same "start" and "stop" signals. Accordingly, teletypewriter RA will respond to permutation code signals originating in transmitter TA and teletypewriter RB will respond to permutation code signals set up in transmitter TB. Thus, the two high-speed start-stop transmitters TA and TB are able to operate independently over the single line wire circuit L to record messages individually on standard receiving teletypewriters RA and RB.

Fig. 2 is a graphical representation of the current and no current telegraphic units of two permutation code combinations, such as those for X and Y. The top line represents the code for the letter X as set up by transmitter TA. The next to the top line shows the code units for the letter Y as originated by the transmitter TB at the same time that the letter X is set up by transmitter TA. The third line represents the line signal, or current in the line, when the code units for X and Y are simultaneously transmitted from distributor D out over line L. It can be seen that this line signal comprises a combination of the code units for X and Y added together with alternate X units from transmitter TA immediately preceding alternate Y units from transmitter TB.

The fourth and fifth lines of Fig. 2 indicate the relative positions of the peaks of the receiving cams employed in the teletypewriters RA and RB for determining whether a received impulse is marking (current) or spacing (no current). The timing of the operation of these cams can be adjusted by an orientation device so that one set of cams will operate toward the front ends of received normal signal impulses while the other set will operate toward the rear ends of the impulses. In accordance with the invention, the orientation devices of the teletypewriters RA and RB are adjusted so that the selecting points of the receiving cams in teletypewriter RA will correspond with the centers of the signal impulses transmitted over channel A while the points of the cams in teletypewriter RB will correspond with the centers of the impulses transmitted over channel B.

It can be seen that the peaks of the cams in teletypewriter RA are located in the first quarter of the length of a normal signal unit and that the peaks of the cams in teletypewriter RB are located in the third quarter of the signal unit length; that is, the peaks of the cams in teletypewriter RA are spaced one-half a normal signal unit length in advance of the peaks of the cams in teletypewriter RB. This enables the receiving cams in teletypewriter RA to respond to the marking units of the signals, such as X, transmitted from transmitter TA and permits the receiving cams in teletypewriter RB to respond to the marking units of the signals, such as Y, transmitted from transmitter TB. Due to the peaks of the cams in teletypewriter RA being spaced one-half a normal signal unit length in advance of the peaks of the cams in teletypewriter RB, the cams in teletypewriter RA will not respond to marking signals transmitted from transmitter TB nor will the cams in teletypewriter RB respond to signals from transmitter TA, even though signals from both transmitters TA and TB pass through both teletypewriters RA and RB.

The sixth line of Fig. 2 shows the selection received by printer RA to be the same as that shown in line 1 which was sent by transmitter TA and the last line of Fig. 2 shows the selection received by printer RB to be the same as that shown in line 2 which was transmitted by transmitter RB. Thus, both teletypewriters RA and RB can simultaneously operate independently of each other in response to signals from transmitters TA and TB, respectively.

Figs. 4, 5, and 6 are detailed views of the transmitting apparatus at the sending station and also show the orientation apparatus at the receiving stations. The relation between these figures and the manner in which they are to be connected is shown in Fig. 3.

Fig. 4 shows a portion of distributor D together with the signal sending mechanism of transmitter TA. As was stated above, transmitter TA is of the type disclosed in Patent 2,055,567. Transmitting tape 5 is perforated with permutation code signals by the perforator which may be one of several well-known types. The tape 5 emerges from the perforator and travels to the sensing pins 6. As is described in Patent 2,055,567, pins 6 are projected into the signal perforations in tape 5 and thereby operate contact tongues 7 which, in turn, selectively operate the marking contacts 8 and the spacing contacts 9. The marking signals travel over conductors 10 to segments 1A, 2A, 3A, 4A, 5A, and 6A of the segmented ring 3 of distributor D and then out over line L.

Fig. 5 shows a continuation of shaft 11 of distributor D together with the mechanism of transmitter TB which is also provided with a perforator. Tape 105 is perforated in the perforator and then passes over the sensing pins 106 which operate contact tongues 107 for operating marking contacts 108 and spacing contacts 109. Marking contacts 108 are connected by conductors 12 to segments 1B, 2B, 3B, 4B, 5B and 6B of the segmented ring 3.

In the drawing, the transmitting apparatus is shown in an idle condition with both sets of sensing pins 6 and 106 withdrawn from tapes 5 and 105. When a supply of perforated tape 5 is available, the operator closes the manually operable switch 13 thereby closing a path for energizing start magnet 14 and magnet MA over a circuit traced from battery 15, through the winding of magnet 14, conductor 16, over switch 13, through the tape tension contacts 17, through the winding of magnet MA, along conductor 18, and then over contacts C1 (Fig. 5) to grounded battery 19. Upon being energized, magnet 14 attracts the left end of its armature 20 thereby removing the right end from engagement with the shoulder 21 of the stop cam 22 thus releasing shaft 11 and brush 4 for rotation by motor 23.

At the same time, magnet MA will attract its armature 24 to close contacts 25 and thus close a locking-up circuit for start magnet 14 and magnet MA to grounded battery 26. This locking-up circuit remains closed until either switch 13 or the tape tension contacts 17 are opened. The operation of armature 24 also pulls back latch 27 thereby releasing the tape feed operating lever 28 for operation by cam 29 and spring 30. As is described in the above-mentioned Patent 2,055,567, the tape feed operating lever 28 is actuated by cam 29 to operate the contact lever bail 31 thereby effecting feeding of the tape 5 and operation of the sensing pins 6. Transmitter TA is thus placed in condition for the transmission of signals over channel A to be recorded on teletypewriter RA.

At this time, transmitter TB has its sensing pins 106 held withdrawn from tape 105 by the contact lever bail 131 which cannot now be operated by the tape feed operating lever 128 because lever 128 is held out of engagement with cam 129 by latch 127 on arm 124 of magnet MB which is not now energized. Consequently, although messages will now be sent over channel A to be recorded on teletypewriter RA, none will be sent over channel B and teletypewriter RB will not now record any message.

A feature of the invention is that both teletypewriters RA and RB are so designed that no printing or spacing will take place therein in response to the reception of a so-called "blank" signal which is a permutation code combination having no marking impulses and consisting entirely of spacing impulses. This is a desirable feature because, during the period of transmission just described, each message signal transmitted from transmitter TA goes out over line L alternately with a spacing impulse caused by brush 4 wiping over segments 1B, 2B, 3B, 4B, 5B and 6B which have no current on them now due to contact tongues 107 being held on their spacing contacts 109.

Thus, while teletypewriter RA is recording messages originating in transmitter TA, the cams in teletypewriter RB will be receiving a series of successive "blank" signals. Accordingly, it is desirable that teletypewriter RB be so designed that no printing or spacing will take place on the receipt of a "blank" signal as otherwise there would be a needless wear of the mechanism in teletypewriter RB and waste of the paper used therein. Teletypewriter RA should be of similar design as there may be periods when transmitter TA would be idle while transmitter TB would be in operation.

When it is desired to transmit messages perforated in tape 105, the operator will close switch 113 which closes a path for current from battery 15 to pass through the winding of magnet 14, along conductor 16, over conductor 32, switch 113, tape tension contacts 117, winding of magnet MB, conductor 118, and then to contact C2. When contact C2 closes, the path just traced will be extended to ground through battery 19 for closing the energizing path for magnets 14 and MB. Magnet 14, if not already energized, operates its armature 20 to release shaft 11 for rotation and magnet MB operates its armature 124 to remove latch 127 from engagement with the tape feed operating lever 128 which is accordingly released for operation by cam 129 and spring 130. This places transmitter TB in condition for the transmission of signals in tape 105 out over channel A for recording by teletypewriter RB.

In this connection it is to be noted that, if transmitter TB is started while transmitter TA is operating, cam 33 will be rotating on shaft 11, and, unless cam 33 happens to be in the position shown in Fig. 5 at the time that switch 113 is closed, contact C2 will be open and the path through magnet MB to grounded battery 19 will also be open. Consequently, magnet MB will not be energized until cam 33 revolves into the position shown in Fig. 5. By means of this timing of the closure of contact C2, the tape feed operating lever 128 will not be released until the proper time in the cycle. This insures that transmitter TB will operate in synchronism with transmitter TA so that the signal units sent from transmitter TB will keep pace with those originating in transmitter TA.

To stop transmission on channel A, switch 13 may be manually operated for deenergizing magnet MA which releases its armature 24 to permit latch 27 to engage with the right end of the tape operating lever 28. This prevents lever 28 from operating the contact lever bail 31 and causes the sensing pins 6 to be withdrawn from tape 5, thereby discontinuing operation of transmitter TA.

If, at this time, transmitter TB is already stopped, then the opening of switch 13 will also cause magnet 14 to become deenergized and release its armature 20 for engagement with shoulder 21 of cam 22 thereby stopping distributor shaft 11 from further rotation and thus placing the transmitting apparatus in the condition shown in Fig. 4 and Fig. 5.

Transmitter TB can be stopped in a similar manner by opening switch 113 which causes magnet MB to release its armature 124 for enabling latch 127 to engage with lever 128 for discontinuing operation of contact lever bail 131 thereby withdrawing the sensing pins 106 from tape 105 and stopping transmitter TB.

Each transmitter can also be stopped by opening its respective tape tension contact 17 and 117 in a manner well known in the art whenever there is a shortage of tape 5 or 105.

The orientation apparatus of the receiving teletypewriters RA and RB is shown in Fig. 6 and is of the type disclosed in Patent 1,989,710 granted February 5, 1935, to A. H. Reiber et al. The disclosure of this Reiber et al. patent is incorporated herein by reference as a part of this specification. As is described in this Reiber et al. patent, the orientation apparatus includes, considering now the teletypewriter RA, stop gate 273 having an arm 287 and mounted for engagement with a latch 276. Adjustable plate 275, which controls latch 276, may be rotated about a pivot stud 278 by turning the knurled thumbpiece 289 which is fixed to one end of shaft 283 suitably carried by the orientation plate member 284. Member 284 has graduations 285 adapted to cooperate with an indicating arm 286 mounted on pivot 278 for indicating the degree of movement of plate 275.

Plate 275 is provided with a segmental gear portion 279 which is adapted to cooperate with a worm pinion 281 which is integral with sleeve 282, mounted on, and pinned to, shaft 283 for rotation therewith. Gate 273 normally tends to rotate clockwise against an eccentric stop member 295 due to the pull exerted by spring 294. A star wheel 288 mounted on sleeve 282 cooperates with a detent member, such as a ball and spring (not shown), housed in cap member 293 mounted on orientation plate 284 and serves to maintain the orientation adjustment.

Thus, rotation of thumb-piece 289 will rotate sleeve 282 with its worm pinion 281 and star wheel 288. Rotation of worm pinion 281 will move the segmental gear portion 279 and thereby effect rotation of the adjusting plate 275 about its pivot 278. This rotation of plate 275 changes the position of the eccentric stop member 295, which, in turn, allows arm 298 of stop gate 273 to move. Movement of arm 298 causes a corresponding change in position of stop gate 273 and its arm 287 which, accordingly, controls the operating conditions of the selecting cams (not shown) in teletypewriter RA as is described in the above-mentioned Reiber et al. patent.

It can be seen from Fig. 6 that teletypewriter RB has its orientation apparatus adjusted oppositely to that of teletypewriter RA. Thus, segmental gear portion 379, adjustable plate 375 and indicating arm 386 are swung to the right. Eccentric stop member 395 is moved up and arms 387 and 398 of stop gate 373 are swung clockwise in teletypewriter RB whereas in teletypewriter RA the corresponding pieces of apparatus are in opposite positions. As was explained above in connection with the description of Fig. 2, by having the orientation apparatus of the teletypewriters RA and RB oppositely adjusted, the receiving cams of teletypewriter RA respond to what would ordinarily be the first half of a signal unit of standard length while the receiving cams of teletypewriter RB respond to what would be the second half. Thus, when messages are transmitted over channels A and B, they comprise a start impulse common to both channels, the No. 1 pulse for channel A, No. 1 pulse for channel B, No. 2 pulse for channel A, No. 2 pulse for channel B, and so forth up to and including the No. 6 pulses which are followed by the stop pulse common to both channels.

Since the orientation apparatus of the teletypewriters RA and RB is oppositely adjusted, the selecting points of the receiving cams in teletypewriter RA will correspond with the centers of the impulses transmitted over channel A while the points of the cams in teletypewriter RB will correspond with the centers of the impulses sent over channel B. Thus, the two transmitters TA and TB can operate simultaneously and independently over the one line L and the messages originating in the transmitters TA and TB will be separately and independently recorded by the receiving teletypewriters RA and RB respectively.

The invention has been described with reference to its preferred embodiment and its preferred application. It is to be understood that the invention is capable of other applications and may be embodied in other forms of apparatus than that specifically shown in the drawings. Consequently, the invention is not to be limited to the particular form and use shown and described but is to be limited only by the claims appended hereto.

What is claimed is:

1. A telegraph distributor for use with two transmitters each having a plurality of marking and spacing contacts and a contact lever bail for effecting the operation of the contacts, a tape feed operating lever for operating one contact lever bail, a second tape feed operating lever for operating the other contact lever bail, said distributor having a drive shaft, a cam mounted on said drive shaft for operating one tape feed operating lever, and a second cam also mounted on the drive shaft for operating the other tape feed operating lever.

2. A telegraph distributor for use simultaneously with two transmitters each having a plurality of marking and spacing contacts and a contact lever bail for effecting the operation of the contacts, a tape feed operating lever for operating one contact lever bail, a second tape feed operating lever for operating the other contact lever bail, said distributor having a drive shaft, a cam mounted on said drive shaft for operating one tape feed operating lever, a second cam also mounted on the drive shaft for simultaneously operating the other tape feed operating lever, and instrumentalities for starting the other transmitter in a predetermined relationship to the operation of the first synchronism with the first transmitter.

3. A telegraph distributor for use simultaneously with two transmitters each having a plurality of marking and spacing contacts and a contact lever bail for effecting the operation of the contacts, a tape feed operating lever for operating one contact lever bail, a second tape feed operating lever for operating the other contact lever bail, said distributor having a drive shaft, a cam mounted on said drive shaft for operating one tape feed operating lever, a second cam also mounted on the drive shaft for operating the other tape feed operating lever, means for starting one transmitter, and instrumentalities for starting the other transmitter in a predetermined relationship to the operation of the first transmitter, said instrumentalities including a pair of contacts and a third cam mounted on said drive shaft for operating said contacts.

4. A start-stop telegraph system comprising in combination a transmitting station, at least two receiving stations, a transmission line for connecting said receiving stations to the transmitting station, said transmitting station having at least two transmitters, each of said transmitters having signal forming means for forming permutation code signal combinations, a distributor having a face-plate, said face-plate having a solid ring and a segmented ring comprising a stop segment and a start segment and a plurality of character segments, said distributor having a brush mounted for rotation and adapted to sweep over the rings on said face-plate, driving means for effecting rotation of said brush, a first group of circuits for connecting one of said transmitters to a first group of character segments, said first group of character segments comprising every other character segment located in alternate sequential order on said segmented ring, and a second group of circuits for connecting another of said transmitters to a second group of character segments each segment of which is separated from the other segments in said second group of character segments by at least one character segment of said first group of character segments, said second group of character segments comprising all the character segments of the segmented ring other than those character segments comprising said first group of character segments.

5. A start-stop telegraph system comprising in combination a transmitting station, at least two receiving stations, a transmission line for connecting said receiving stations to the transmitting station, said transmitting station having at least a first transmitter and a second transmitter, each of said transmitters having signal forming means for forming permutation code signal combinations, operating means for operating the signal forming means in the first transmitter and at the same time operating the signal forming means in the second transmitter, a distributor for sending out over the transmission line to the receiving stations a permutation code signal combination formed by the first transmitter while at the same time sending out a permutation code signal combination formed by the second transmitter, said distributor having a face-plate provided with a solid ring and a segmented ring comprising a stop segment and a start segment and a plurality of character segments, said distributor having a brush mounted for rotation and adapted to sweep over the rings on said face-plate, driving means for effecting rotation of said brush, a first group of circuits for connecting said first transmitter to a first group of character segments, said first group of character segments comprising every other character segment located in alternate sequential order on said segmented ring, and a second group of circuits for connecting said second transmitter to a second group of character segments each segment of which is separated from the other segments in said second group of character segments by at least one character segment of said first group of character segments, said second group of character segments comprising all the character segments of the segmented ring other than those character segments comprising said first group of character segments.

6. A start-stop telegraph system comprising in combination a transmitting station, at least two receiving stations, a transmission line for connecting said receiving stations to the transmitting station, said transmitting station having at least a first transmitter and a second transmitter, each of said transmitters having signal forming means for forming permutation code signal combinations composed of groups of character unit signals, operating means for operating the signal forming means in the first transmitter and at the same time operating the signal forming means in the second transmitter, a distributor for sending out over the transmission line to the receiving stations a stop impulse and a start impulse and the first character unit signal of a permutation code combination formed by the first transmitter followed by the first character unit signal of a permutation code combination formed by the second transmitter and then the second character unit signal of the permutation code combination formed by the first transmitter followed by the second character unit signal of the permutation code combination formed by the second transmitter and so forth alternately for all the character unit signals of a permutation code signal formed by the first transmitter and a permutation code signal formed by the second transmitter, said distributor having a face-plate provided with a solid ring and a segmented ring comprising a stop segment and a start segment and a plurality of character segments, said distributor having a brush mounted for rotation and adapted to sweep over the rings on said face-plate, driving means for effecting rotation of said brush, a first group of circuits for connecting said first transmitter to a first group of character segments, said first group of character segments comprising every other character segment located in alternate sequential order on said segmented ring, and a second group of circuits for connecting said second transmitter to a second group of character segments each segment of which is separated from the other segments in said second group of character segments by at least one character segment of said first group of character segments.

7. A start-stop telegraph system comprising in combination a transmitting station, a first receiving station, a second receiving station, a transmission line for connecting said receiving stations to the transmitting station, said transmitting station having at least a first transmitter and a second transmitter, each of said transmitters having signal forming means for forming permutation code signal combinations composed of groups of character unit signals, operating means for operating the signal forming means in the first transmitter and at the same time operating the signal forming means in the second transmitter, a distributor for sending out over the transmission line to the receiving station a stop signal and a start signal and a plurality of character unit signals which constitute a permutation code signal combination formed by the first transmitter and at the same time sending out another plurality of character unit signals constituting a permutation code signal combination formed by the second transmitter, said distributor having a face-plate provided with a solid ring and a segmented ring and a plurality of character segments, said distributor having a brush mounted for rotation and adapted to sweep over the rings on said face-plate, driving means for effecting rotation of said brush, a first group of circuits for connecting said first transmitter to a first group of said character segments, a second group of circuits for connecting said second transmitter to a second group of said character segments, receiving means at each of said receiving stations for receiving all of the signals sent out by said distributor, first orientation apparatus at the first receiving station for rendering a first group of character unit signals comprising every other character unit signal transmitted in alternate sequential order by said distributor ineffective to perform any useful function at said first receiving station, and second orientation apparatus at the second receiving station for rendering a second group of character unit signals comprising alternate character unit signals transmitted by said distributor each of which is different from the character unit signals comprising said first group of every other character unit signals ineffective to perform any useful function at said second receiving station.

EDWARD F. WATSON.